Jan. 27, 1970  G. N. GUILLOT ET AL  3,492,165
BATTERY OF HIGH-TEMPERATURE OPERATING FUEL CELLS
Filed Oct. 2, 1967  3 Sheets-Sheet 1
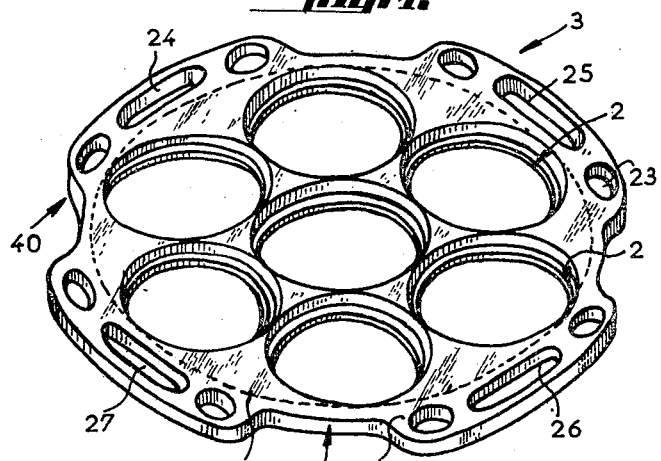
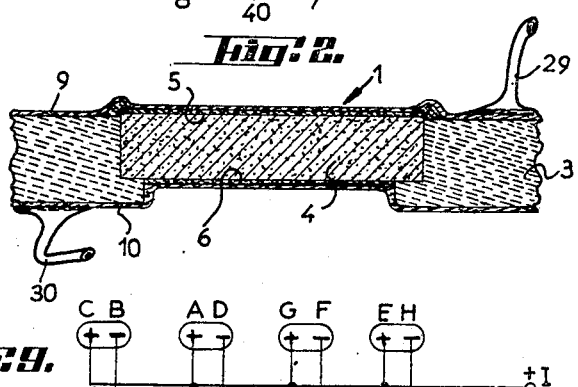
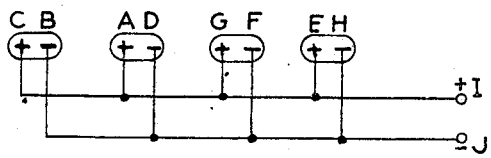
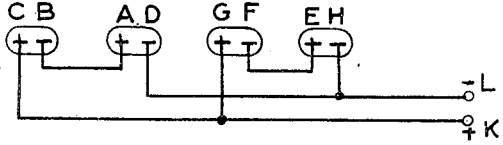
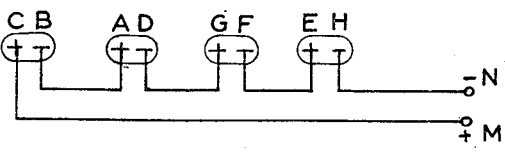
INVENTORS
GERARD NOËL GUILLOT
CLAUDE RAYMOND LEBRAS
MARC GEORGES LOUICHON
BY Nolte & Nolte
ATTORNEYS Jan. 27, 1970   G. N. GUILLOT ET AL   3,492,165
BATTERY OF HIGH-TEMPERATURE OPERATING FUEL CELLS
Filed Oct. 2, 1967   3 Sheets-Sheet 2
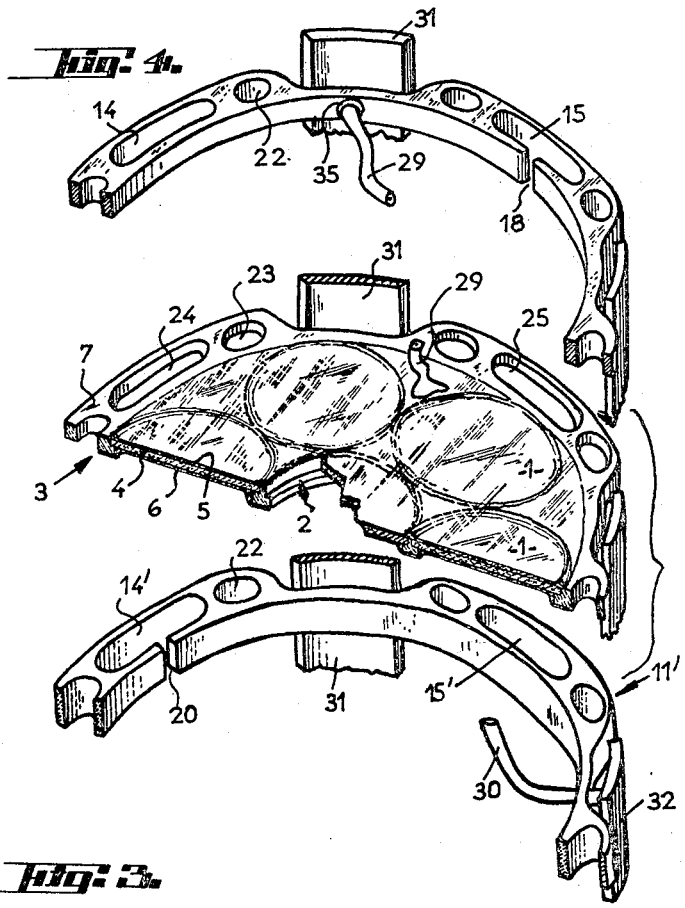
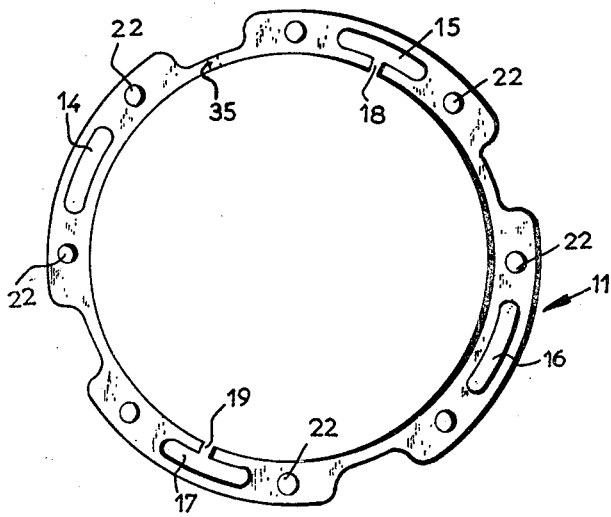
INVENTORS
GERARD NOËL GUILLOT
CLAUDE RAYMOND LE BRAS
MARC GEORGES LOUICHON
BY
ATTORNEYS Jan. 27, 1970    G. N. GUILLOT ET AL    3,492,165
BATTERY OF HIGH-TEMPERATURE OPERATING FUEL CELLS
Filed Oct. 2, 1967    3 Sheets-Sheet 3
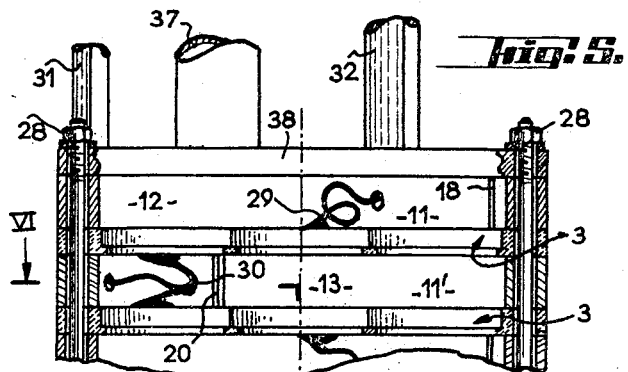
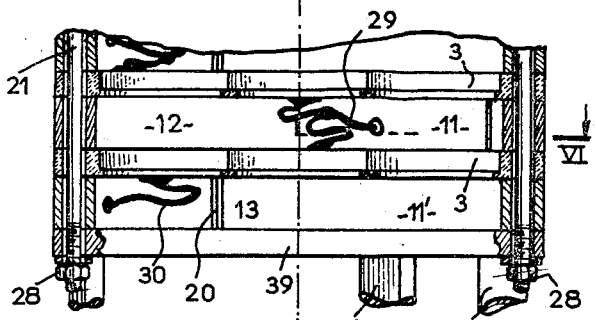
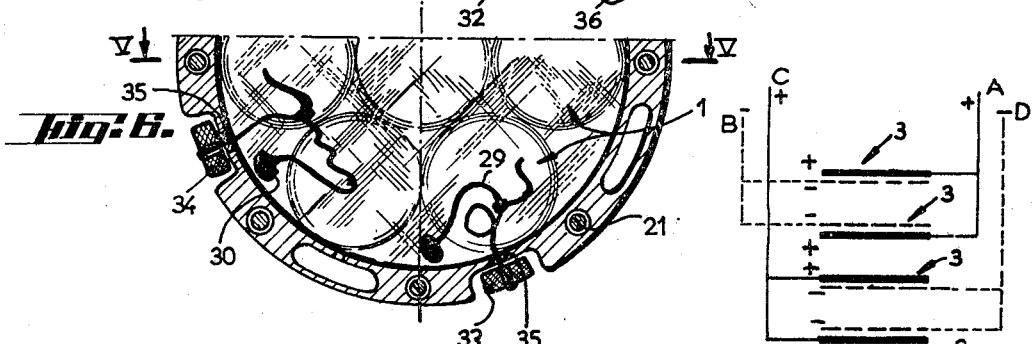
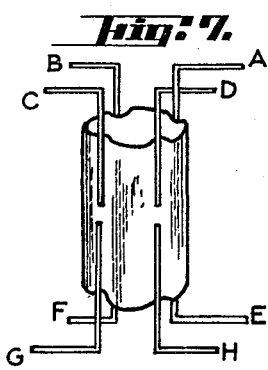
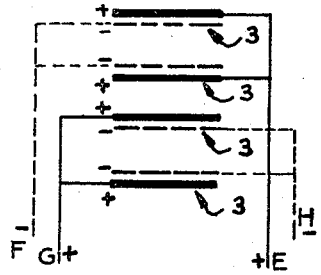
INVENTORS
GERARD NOËL GUILLOT
CLAUDE RAYMOND LEBRAS
MARC GEORGES LOUICHON
BY Nolte & Nolte
ATTORNEYS United States Patent Office 3,492,165
Patented Jan. 27, 1970

3,492,165
BATTERY OF HIGH-TEMPERATURE OPERATING FUEL CELLS
Gerard Noel Guillot, Paris, Claude Raymond Le Bras, Sceaux, and Marc Georges Louichon, Joinville-le-Pont, France, assignors to Gaz de France, Paris, France, a national service of France
Filed Oct. 2, 1967, Ser. No. 672,215
Claims priority, application France, Oct. 3, 1966, 78,617, Patent 1,508,147
Int. Cl. H01m 27/04, 17/00, 27/22
U.S. Cl. 136—86                  10 Claims

ABSTRACT OF THE DISCLOSURE

Battery of fuel-cells comprising a porous base forming a retention structure for a fused electrolyte comprised between two porous electrodes. Said cells are in the shape of disks, each face of which bears respectively the anode or the cathode, the core of which is made up of said porous base. They are caught on their edges within cavities provided on plates constituting a framework supporting several disks. A multiplicity of plates are piled upon each other with interposition of bracing crowns forming between each pair of adjacent plates a fuel or a comburent compartment, the different elementary cells being electrically connected.

---

The present invention relates essentially to a battery of fuel cells of the type comprising elementary cells made up of a porous base forming retention structure for an electrolyte of the fused bath sort, and by two porous electrodes, namely a cathode and an anode through which flow respectively the oxygenous comburent and the fuel, said cells being more particularly of the kind operating at a high temperature, ranging from about 500° C. (945° F.) to 900° C. (1655° F.) and preferably from about 550° C. (1025° F.) to 800° C. (1475° F.).

It is known that many technological difficulties are met in constructing fuel-cell batteries, especially concerning the proper physical and chemical holding of the involved materials, the uphold of appropriate catalytic action, the perfect fluid-tightness of the comburent and fuel supply connections as well as that of their respective compartments, the setting up of the electrical connections of the different elementary cells, the correct overall operation of each cell, etc.

In the known cells, the active surface has been increased by achieving large-size monocells in order to raise the electrical output. Their construction and application meet important difficulties, especially concerning their mechanical holding, the maintaining over large surfaces of the contacts between electrodes and electrolyte, their heterogenous operations, etc., said difficulties resulting in an unsatisfactory output capacity, if compared to the volume of each unit.

The present invention aims at overcoming these difficulties with an inexpensive technical construction, perfectly adapted for a serial production of fuel-cell batteries. Moreover, the capacity of a battery carried out in accordance with the invention is especially high.

A battery according to this invention is remarkable in that said elementary cells are constituted by substantially flat disks, each face of which bears respectively the anode or the cathode of the cell and the core of which is made up by the aforesaid porous base forming an electrolyte-retaining structure. The disks are caught on their edges within small cavities provided on plates having a thickness substantially equal to that of said disks, said plates constituting a rigid assembly or framework able to support several disks arranged in a dense filling network. By adopting this honeycomb-like constructions, it is easy to appreciate that the disks may be manufactured by mass-production and that these disks may be given the sizes and shapes which are best suitable for their service.

According to another salient feature of the invention, said plates are piled upon each other, a bracing crown being inserted between each pair of adjacent plates, said bracing crown extending substantially over the external contour of said plates, so as to form free spaces within said crowns and between adjacent plates, to serve as comburent supply and fuel supply compartments wherein open the corresponding means connections, said compartments being arranged in an alternating succession along said pile of crowns and plates, both opposite faces of the latter being always of the same polarity.

According to another feature of the invention, borings are provided to pass axially through the piled-up crowns, said borings communicating with those of the next crowns by means of similar additional borings opened in the vicinity of the plate peripheries and serving as circulation tubes for the comburent and the fuel. Besides, each circulation tube is connected with the aforementioned compartments by means of a connecting hole for every two crown stages, and normally so that the comburent circulation tubes are connected with the comburent compartments bearing for instance the even stage numbers while the fuel circulation tubes are connected with the fuel compartments bearing, in the same example, the odd stage numbers.

The invention achieves thus very easily and efficiently a fluid-tight introduction and exhaustion of the comburent gas and the fuel into and out of the cell.

According to another salient feature of the invention, the aforesaid crowns may be mounted on the aforementioned disks in at least two angular positions about the axis of the piling-up, the open borings of a crown being opposed to either corresponding boring of the adjacent disk. Thus, the same type of crown may be employed for both the comburent and the fuel compartments by an angular shifting to a proper position of the crown during the assembly of the battery. This feature eases in a considerable proportion the manufacturing of the device.

According to still another feature of the invention, both faces of every disk are interconnected by means of leads, for instance of a nature similar to that of the corresponding electrode, all of the elementary cells being thus parallel-connected in a single plate. Hence, a single collecting wire per polarity of each plate is required to collect the current supplied by the battery.

Many other features and advantages of the present invention will appear more clearly from the following description made with reference to the accompanying drawings given only by way of example and wherein:

FIGURE 1 is a perspective view of a framework plate designed to support, according to this invention, elementary cells;

FIGURE 2 is a sectional view on a larger scale, showing an elementary cell arranged within a cavity of the plate illustrated by FIGURE 1;

FIGURE 3 is a plane view of a bracing crown used during the assembly to separate two cell-bearing adjacent plates;

FIGURE 4 is an exploded perspective view with partial breaking-away, illustrating the relative position of the different component parts during the assembly of the battery;

FIGURE 5 is a longitudinal cross-section (made substantially along lines V—V of FIGURE 6) with partial breaking-away, showing some details of the battery assembly;

FIGURE 6 is a cross-section (made substantially along lines VI—VI of FIGURE 5) with a partial breaking away;

FIGURE 7 is a schematic perspective view illustrating a special mounting of the current-collecting rods in a battery of the type shown on the preceding figures;

FIGURE 8 is a wiring diagram presenting the electrical connections between eight plates of the invented battery, together with the eight collecting rods of the FIGURE 7; and FIGURES 9 to 11 show wiring diagrams of three connection layouts linking up the connecting rods of FIGURES 7 and 8 in order to obtain different tensions at the battery terminals.

According to the method of embodiment shown in the figures, the elementary cells 2, in the shape of substantially flat disks with a circular cross-section, are caught by their edges in the cavities 2 provided in the plates 3, the thickness of which is close to that of the disks 1. Each disk-shaped elementary cell 1 includes a porous supporting structure 4, intended to retain an electrolyte and bearing on each face an electrode, respectively an anode 5 and a cathode 6, for example of sintered nickel and sintered silver. The rigid structure of plates 3 is for instance metallic and is in such case advantageously coated with a refractory compound, for example a refractory oxide applied by any means, such as spray gun projection, said refractory layer being insulating and resisting to corrosion under the operating conditions of the battery. Peripheral bands 7 (outwards from the dotted line 8 on FIGURE 1) are then left free and worked out so as to secure the tightness after assembly with the adjacent cells of the battery as it will later appear.

Alternately, the plate frameworks 3 may be worked directly out of a refractory material, for instance of moulded ceramics.

The parallel connection between the different elementary cells 1 in each plate 3 is advantageously achieved by means of a conductor film, for example of the same nature as the corresponding electrode, said film coating each face of the aforesaid plates 3. Thus, on the anode side, the parallel connection of the different anodes 5 is advantageously achieved by a nickel film 9, while, on the cathode side, the cathodes 6 are preferably interconnected by means of a silver film 10. The films 9 and 10 are for instance applied through flame-projection or by any other process.

The battery itself is constituted by a number of plates similar to the plates 3, piled upon each other, while a bracing crown 11 (FIGURE 3), extending substantially over the external contours 7 of the plates 3 is inserted between each pair of adjacent plates. The crowns 11 define thus between two adjacent plates fluid-tight compartments, respectively anodic 12 and containing the fuel, or cathodic 13 and containing the comburent. The compartments 12 and 13 alternate along the pile made up by the plates 3 and the crowns 11, the opposite faces of said plates 3 being always of the same polarity.

The borings 14 to 17 pass through the crowns 11, along axes parallel to the axis of the pile, the communication between the crowns 11 being secured through similar borings 24 to 27 provided in the peripheral areas of the plates 3.

The different borings provided in the plates 3 and the crowns 11 constitute, when the latter are assembled, four conduits, namely a fuel inlet conduit, a fuel outlet conduit, a comburent inlet conduit and a comburent outlet conduit. Advantageously, a sweeping-through and a recirculation of the combustion products and of the comburent may be carried out. Each conduit is provided with a communicating orifice located at every second successive crown stage, in such a way that the conduits wherein circulates the comburent communicate, for example, with the compartments bearing an even stage number, while the fuel conduits communicate, in the same case, with the fuel compartments bearing odd stage numbers.

Thus, in FIGURES 4 and 5 have been marked by reference number 11 the crowns corresponding to the anodic fuel compartments, while reference numbers 11' indicate the cathodic comburent compartments. The aforesaid communicating orifices between the circulation conduits and the compartments are advantageously made up of slits (such as 18, 19 and 20 of FIGURES 3 and 4) carried out in some borings of the crowns 11 and 11'.

According to the shown method of embodiment, the borings 14 to 17 of the crowns 11 are arranged with an angular interval of 90° between each other, and it becomes evident that the crown 11' is identical in construction to the crown 11 and that it has only been shifted at 90° about the pile axis. This means that the slit 20 (FIGURE 4) of crown 11' corresponds to the slit 18 of crown 11, its position having been only shifted away counter-clockwise by 90°.

The pile is easily assembled by means of threaded rods or bolts 21 passing through the holes 22 and 23 provided respectively in the crowns 11 or 11' and at the periphery 7 of plates 3. The fluid-tightness of the assembly (namely that of the compartments 12 and 13 as well as that of the circulation conduits for the comburent and for the fuel) is secured by the machined bearing surface 7 of the plates 3, said bearing surface being applied tightly against the crowns 11 when the assembly screws 28 are suitably clamped over the rods 21. If desired, additional packings may be provided.

In the illustrated method of embodiment, eight assembly rods 21 are used.

The current supplied by the different elementary cells 1 is collected on each plate face by respective anodic leads 29 and cathodic leads 30, for instance welded to the respective metal films 9 and 10. The wires 29 and 30 bring the current to collecting rods such as 31 to 34 (FIGURES 4 to 6). The collecting wires 29 and 30 pass through the crowns 11 and 11' for instance through an insulating packing 35 (FIGURE 4). Said crowns 11 and 11' may be worked out of metal, for example of steel. They may also be made but of a refractory insulating material, such as a ceramic.

In FIGURE 5, it may be seen that the leads 29 and 30 bifurcate in each compartment 12 or 13 to become two wires designed to collect the current from the opposite adjacent faces with the same polarity of two plates 3. This lessens the number of wires required to collect the current.

In FIGURES 7 and 8 is represented a schematised method of embodiment wherein eight collecting rods A to H are used to collect the current supplied by eight crown-plate assemblies 3. In the FIGURE 8, the different polarities of the anodes and the cathodes are indicated, as well as that of the collecting rods associated to these electrodes.

The joining up of the rods A to H may then be performed in various manners.

FIGURES 9 and 11 illustrate thus three joining up methods for the rods A to H, supplying respectively a 1 volt tension between the point I to J, a 2 volts tension between the points K to L and a 4 volts tension between the points M to N. The tension at the terminals of an elementary cell is of about one volt.

Besides, it will be noted that in FIGURE 5 the conduits 36 and 37 supplying respectively the gaseous fuel and the gaseous comburent to the battery are arranged substantially along the axes of the borings 15 and 14 of the crowns 11 (FIGURE 3), and are provided with respective slits 18 and 20. Similar (but not represented) outlet conduits for the comburent and for the fuel are of course arranged substantially in the axes of the borings 16 and 17. The plates 38 and 39 make up both ends of the pile.

Many constructional modifications may be brought in the described method of embodiment. Thus, in the shown example, the external configuration of the battery was substantially that of a circular cylinder and each plate 3 (also substantially circular except for the recesses in the area indicated by 40 and intended to receive the current-collecting rods) housed a tight network of elementary cells having the shape of flat circular disks.

It is obvious that any other dense network may be used and that the plates 3 may have a section other than circular for instance hexagonal, square or polygonal, while the disks may also be other than circular, for instance hexagonal, triangular, etc. In any case, the shapes and the dimensions of the disks constituting the elementary cells will be selected in such a way as to fill densely the plates and to secure the best possible operation to each elementary cell.

In addition, by cutting the current-collecting rods at appropriate spots and by providing a suitable external wiring to the battery, it becomes possible to achieve series-connections or parallel-connections without increasing the radial cumbersomeness of the battery. The FIGURES 7 to 11 show the results obtained with four collecting rods cut once each and forming thus eight rods A to H.

The batteries obtained according to this invention may subsequently be grouped in a close network made up of a number of batteries.

Likewise, the nature of the different component elements may also be variable.

By way of example following constructions have been found very satisfactory:

EXAMPLE 1

The framework of the plates 3 is worked out of stainless steel coated with zirconium with the help of a spray gun. In the cavities 2 are embedded magnesia disks 1 impregnated with a binary eutectic mixture of sodium and lithium carbonates. By means of a spray gun, the anode face of the disk 1 is coated with a thin film of nickel, while the cathode face is likewise coated with a silver film. These films make up the active electrodes of the cell. Subsequently, a nickel deposit 9 and a silver deposit 10 are carried out as explained hereabove.

EXAMPLE 2

Instead of using magnesia retention structures 4, as in the previous example, the structures are of lithium aluminate, for instance of the type described in the French patent application Ser. No. 78,615 filed by this applicant on Oct. 3, 1966, under the title: "Stable Retention Structures for Electrolytes of High-Temperature Operating Fuel Cells." The anode 5 is worked out of sintered nickel, whereas the cathode is made of a sintered mixture of silver and copper oxide, for example of the type described in the French patent application Ser. No. 78,616, filed by this applicatant on Oct. 3, 1966 under the title: "Porous Active Electrodes for Oxygenous Comburents Used in Fuel-Cells."

Many other modifications may be brought to the device of the invention without leaving by that its scope. Consequently, be it understood that this invention is by no means limited to the described and illustrated methods of embodiment, given only by way of example, and that it is justified by the accompanying claims.

What is claimed is:

1. A battery of fuel-cells of the type operating at a high temperature, ranging from about 500° C. (945° F.) to 900° C. (1655° F.), comprising elementary cells made up of two porous electrodes, namely a cathode and an anode through which flow respectively the oxygenous comburent and the fuel, disposed between said electrodes a porous base forming a retention structure for an electrolyte of the fused bath type, said elementary cells are constituted by substantially flat disks, each face of which bears respectively the anode or the cathode of the cell and the core of which is made up of the aforesaid porous base, plates having a thickness substantially equal to that of said disks, said disks being caught on their edges within small cavities provided on said plates, said plates constituting a rigid assembly or framework supporting several disks arranged in a dense filling network.

2. Battery of fuel-cells according to claim 1, wherein said plates are piled upon each other with their opposite faces being of the same polarity, and wherein between each pair of adjacent plates is inserted a bracing crown extending substantially over the external contour of said plates, so as to form successive free spaces or compartments within said crowns and between said adjacent plates, supplying conduits of fuel and oxygenous comburent respectively opening in an alternative succession into said successive compartments and exhausting conduits for the burnt gas and unconsumed fuel or oxygenous comburent respectively opening in each of said compartments.

3. Battery of fuel-cells according to claim 2, wherein borings are provided to pass axially through the piled-up crowns and plates, the borings provided in said crowns communicating with those of the next crowns by means of the corresponding borings opened in the vicinity of the plate peripheries said communicating borings forming said supplying and exhausting conduits, each of said fuel supplying conduits opening into said compartments by means of a connecting slit for every two crown stages, each of said comburent supplying conduits opening into said compartments by means of a connecting hole for every two crown stages which are different from said stages communicating with said fuel supplying conduits.

4. Battery of fuel-cells according to claim 2 wherein four of the aforementioned conduits are provided, respectively for the inlet and outlet of the comburent and of the fuel.

5. Battery of fuel-cells according to claim 3 wherein four of the aforementioned borings are provided in each of said crown and said plate and arranged with an angular interval of 90°, two of said borings provided in each of said crowns opening towards the inside of said crown to make up the aforesaid communicating slits, the two other borings having no slit.

6. Battery of fuel-cells according to claim 3 wherein the aforesaid crowns may be mounted upon the aforesaid plates in at least two angular positions about their axis of revolution, so as to be able to oppose the slitted or not slitted borings of a crown with either type of corresponding borings of the adjacent disk.

7. Battery of fuel-cells according to claim 3 wherein additional communicating orifices are bored through the aforesaid crowns and plates to give passage throughout the pile to assembling screws.

8. Battery of fuel-cells according to claim 1 wherein the aforementioned plates are at least partly coated with an insulating and anti-corosive refractory compound.

9. Battery of fuel-cells according to claim 1 wherein both faces of every disk are interconnected by means of leads, all of the elementary cells being thus parallel-connected in a single plate.

10. Battery of fuel-cells according to claim 9 wherein collecting rod means extend parallel to the pile axis and are joined up to connecting wires, the latter being in turn connected to the corresponding plate faces, in order to collect the current from the electrodes of a given polarity of the aforementioned elementary cells.

References Cited

UNITED STATES PATENTS

| 3,149,921 | 9/1964 | Warner | 136—86 X |
| 3,298,867 | 1/1967 | Diotalevi | 136—86 |
| 3,331,706 | 7/1967 | Jenkins | 136—86 |

FOREIGN PATENTS 950,096  2/1964  Great Britain.

ALLEN B. CURTIS, Primary Examiner

U.S. Cl. X.R.

136—120